Patented Nov. 25, 1941

2,263,766

UNITED STATES PATENT OFFICE 2,263,766

SLUDGE COKING PROCESS

Carroll D. Fentress, Hammond, Claude P. McNeil, Whiting, and Edwin G. Wiley, Hammond, Ind., assignors to Standard Oil Company, Chicago, Ill., a corporation of Indiana Application November 9, 1938, Serial No. 239,620

1 Claim. (Cl. 23—177)

This invention relates to the coking of acid sludge and to the recovery of products such as coke, oil and sulfur dioxide therefrom.

Sludges produced in the acid treating of petroleum oils have long presented a serious problem since it is difficult to dispose of them and since it is desirable to recover therefrom valuable products such as oil, coke and sulfur dioxide for sulfuric acid manufacture or other use. One process which has been designed to solve this problem involves the heating of the acid sludge in the presence of hot coke to produce further coke therefrom and to drive off products including sulfur dioxide and oil which can be recovered for use.

It is an object of our invention to provide improved methods and apparatus for the coking of acid sludge. A more detailed object of our invention is to provide methods and apparatus for coking acid sludge which will give an increased recovery or, in other words, decreased loss of sulfur dioxide. A further object of our invention is to provide such processes and apparatus with a view to decreasing the amount of sulfur dioxide sent to the sewer or to the atmosphere since contamination of sewage or the atmosphere is undesirable. Other and more detailed objects, advantages and uses of our invention will become apparent as the description thereof proceeds.

Figure 1:
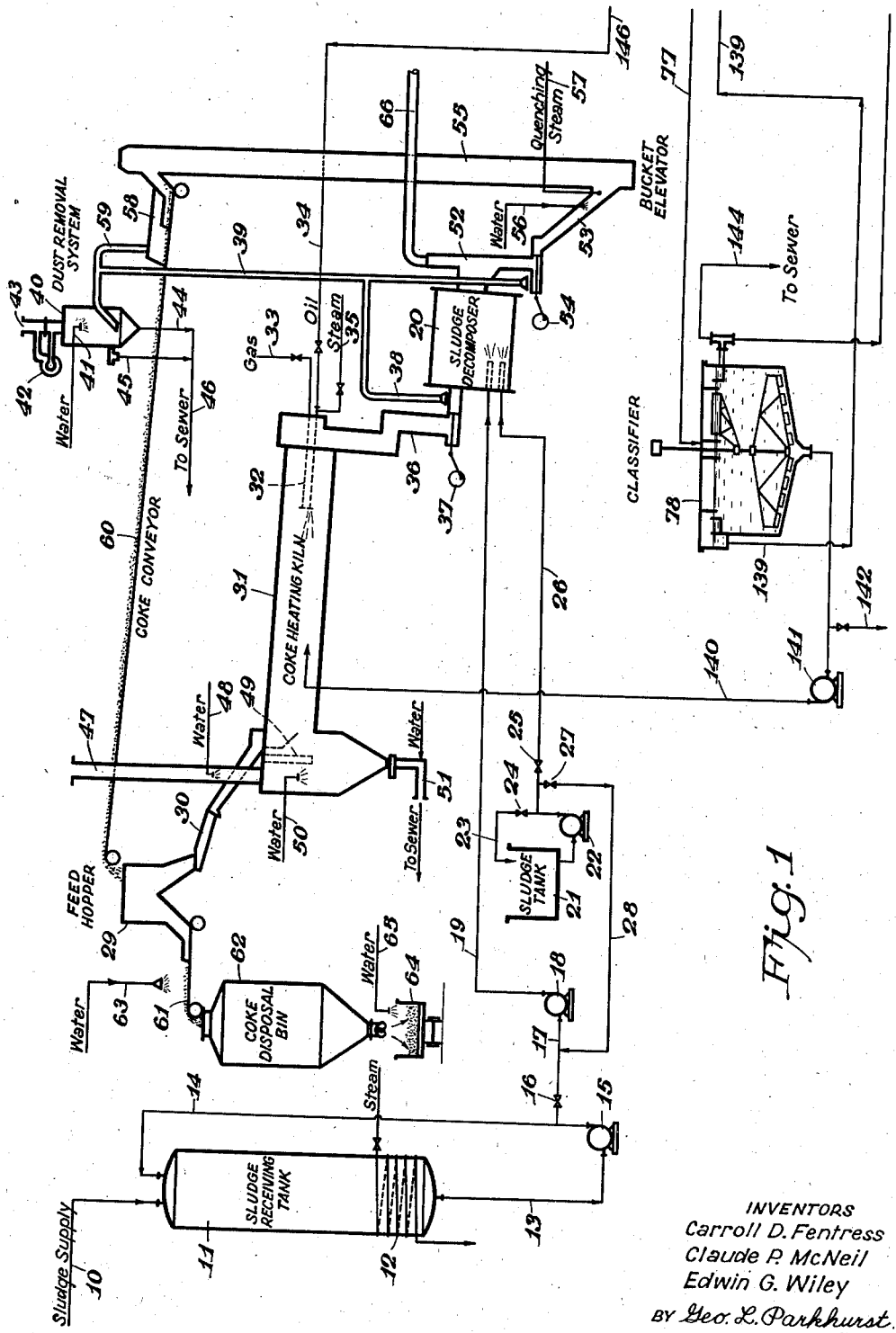
Figure 2:
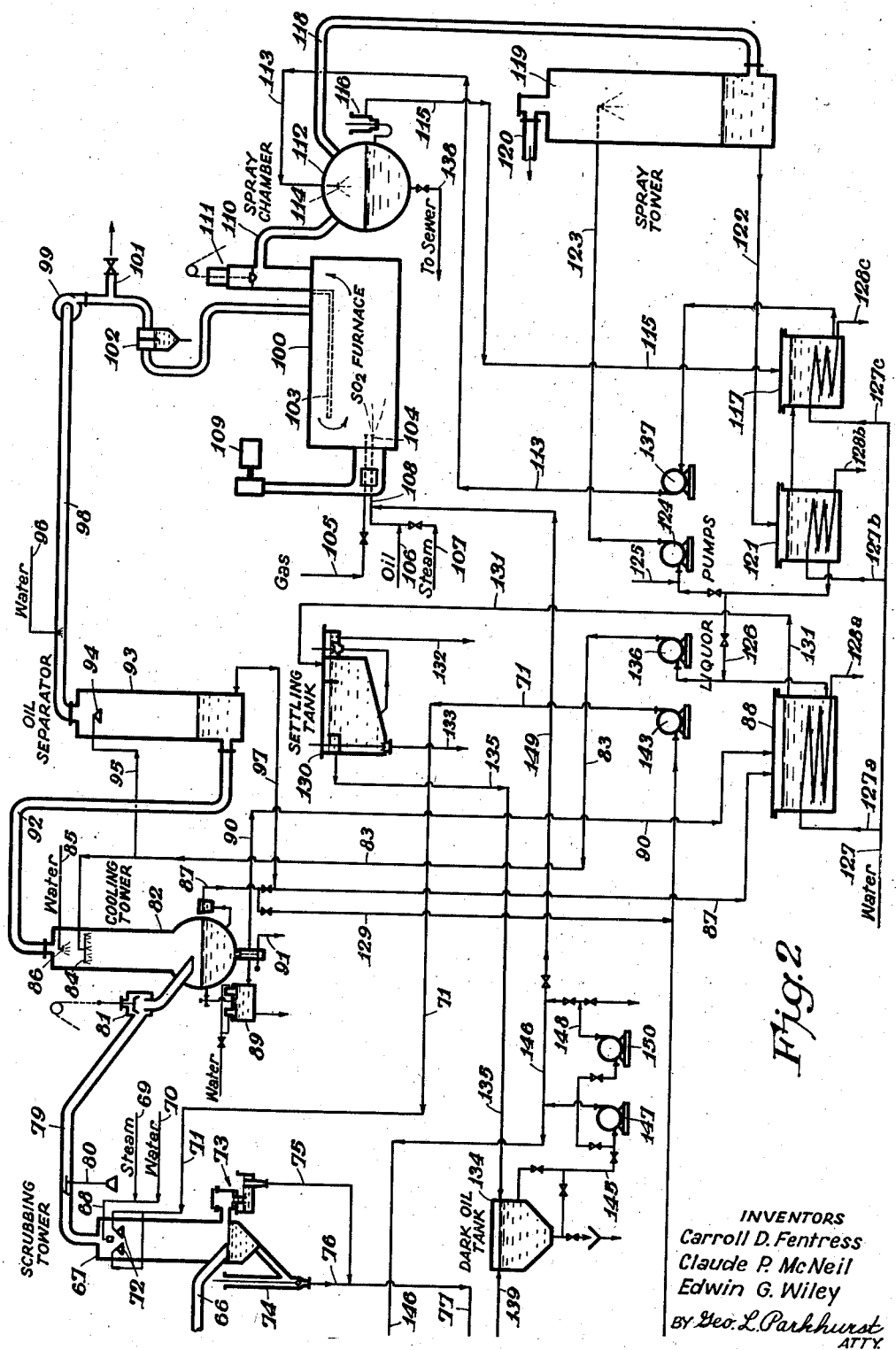

While this invention is susceptible to numerous embodiments, one specific embodiment is shown in the accompanying drawings, Figure 1 and Figure 2 taken together representing a simplified flow diagram. Figure 1 represents chiefly the sludge conversion process and Figure 2 the purification of the sulfur dioxide therefrom. Other modifications will occur to those skilled in the art and are intended to be covered to the extent that they fall within the scope of the appended claim.

Acid sludge from the acid treatment of oils or other source is conducted through line 10 to sludge-receiving tank 11. Steam coils 12 are located about sludge-receiving tank 11 to provide necessary heat and sludge may be circulated through lines 13 and 14 by means of pump 15 for mixing.

Sludge is conveyed through valve 16 in line 17 from line 14 by means of charging pump 18 and line 19 to sludge decomposer 20 wherein it is subjected to the action of hot coke.

Additional sludge differing in physical characteristics from that received in sludge-receiving tank 11 may be conveyed from any suitable source to tank 21. This sludge may be circulated by pump 22 through line 23, having valve 24, for purposes of mixing. From sludge tank 21 sludge may be directed through valve 25 and line 26 to sludge decomposer 20 or through valve 27 and line 28 to line 17 where it is mixed with the charge from the sludge-receiving tank.

Coke from feed hopper 29 is fed by means of vibrating feeders 30 to coke-heating kiln 31. Burner 32, which may be fired by means of gas through line 33 or by oil through line 34 and steam through line 35, is located in coke heating kiln 31 opposite the coke entrance. Hot coke from coke heating kiln 31 is conveyed through passage 36 to sludge decomposer 20 where it is injected by means of plunger feeder 37. Dust from the coke which may escape from passage 36 is collected through line 38 which joins line 39 from the exit of sludge decomposer 20. A dust-removal system 40 having a water spray 41 and a fan system 42 serves to remove the dust from lines 38 and 39. Vent 43 permits the escape of gases and any unremoved dust while the remainder of the dust plus the water from spray 41 is led through lines 44 or 45 to line 46 which leads to disposal means.

From coke-heating kiln 31 excess flue gases escape through vent 47 which is cooled by water spray 48. To remove any entrained dust or coky material which may rise back of baffle wall 49, water is injected through spray 50, the dust-laden water being delivered to disposal means through line 51.

The products of decomposition, consisting of coke and gas containing sulfur dioxide, hydrocarbons, water vapor, carbon dioxide, air, dust, etc., exit from sludge decomposer 20 through stationary header 52. Coke is conveyed to passage 53 by means of plunger feeder 54 thence to elevator 55 which may be of the bucket type. The coke can be cooled by water from spray 56 and can be further quenched by steam from line 57. Coke raised through bucket elevator 55 passes to dust collector hood 58 from which leads line 59 which joins line 39 and passes to dust-removal system 40. The coke is conveyed by coke conveyor 60, which can be of the endless belt type, to feed hopper 29. That part of the coke not necessary for return to coke-heating kiln 31 passes to coke conveyor 61 which leads to coke disposal bin 62. The coke on coke-conveyor 61 can be cooled by spraying with water from spray 63. Coke from coke-disposal bin 62 can be dumped into cars 64, which are sprayed with water from spray 65, for removal from the system.

Gases from stationary header 52 are conveyed by line 66 to scrubbing tower 67 where they impinge upon cooling liquor. Cooling water and/or steam can be injected through line 68 from lines 69 and/or 70 for emergency cooling. Cooling liquor is injected into scrubbing tower 67 through line 71 terminating in sprays 72. A continuous overflow unit 73 or an intermittent overflow unit 74 may be used for the removal of water and condensed material from tower 67. This material passes through lines 75 or 76 to line 77 which leads to a separating means 78, preferably of the Dorr classifier type.

Cooled gases are carried overhead from scrubbing tower 67 through line 79 having damper 80 which controls the vacuum in the system, and jug valve 81 for shutting off one unit if two or more scrubbing towers 67 are used with cooling tower 82. This tower is supplied with cooling liquor through line 83 and spray 84. Emergency water is supplied through line 85 and spray 86. The cooling liquor may be removed from cooling tower 82 by line 87 which leads to liquor-cooling tank 88.

Condensed oil is withdrawn from cooling tower 82 through overflow seal box 89 and line 90 which leads to liquor cooler 88. Line 91 which leads to suitable disposing means is used for draining the tower in emergency. Overhead gases from cooling tower 82 are passed through line 92 to oil separator 93 which is equipped with spray 94 for dispersing cooling medium from line 83 and line 95. Emergency water spray 96, thermostatically controlled, prevents unduly high temperatures at the gas exit. The condensed oil and liquor flow through line 97 to line 87 and thence to liquor-cooling tank 88 for further cooling.

The gases from oil separator 93 are taken overhead through line 98 and blower 99 to sulfur dioxide furnace 100 having suitable baffled checkerwork. Inserted in line 98 between blower 99 and sulfur dioxide furnace 100 is a vent 101 and a water seal 102 for the prevention of blow back from sulfur dioxide furnace 100, when the plant is not in operation and the furnace is being heated. Gases pass into sulfur dioxide furnace 100 about baffle wall 103 to contact the heat from burner 104. This burner can be fired by means of gas through line 105 or oil through line 106 and steam through line 107 which lead to line 108. Blower 109 adds air for the combustion of the uncondensed hydrocarbons. Sulfur dioxide from sulfur dioxide furnace 100 passes through duct 110 (having vent 111 for starting up only) to spray chamber 112. Cooling liquor from line 113 sprays through spray 114 to cool the gases from furnace 100. The water with dissolved sulfur dioxide is removed through line 115 having automatic overflow control 116 to liquor-cooling tank 117. Sulfur dioxide gas passes through line 118 and is further cooled in spray tower 119, equipped with ring packing, and taken overhead through line 120 to any suitable system for converting the sulfur dioxide to sulfuric acid, etc.

Liquor from spray tower 119 passes to liquor-cooling tank 121 through line 122 and is recirculated to the spray tower 119 through line 123 and pump 124.

Fresh water may be added for additional cooling in the spray tower through line 125. Excess liquor passes through valved line 126 to line 83 and cooling tower 82.

Cooling water is supplied to liquor-cooling tanks 88, 117 and 121 through lines 127, 127a, 127b and 127c, and discharged to the sewer through lines 128a, 128b and 128c. The liquor from cooling tower 82 and oil separator 93 is partially separated in liquor cooling tank 88. Excess liquor from cooling tower 82 can be withdrawn from line 87 and directed to scrubbing tower 67 through line 129 and line 71. The oil and condensables present plus excess water flow to settling tank 130 through line 131 where a further separation between water and oil is made. The separated water flows to the sewer through lines 132 or 133 and the separated oil is conveyed to dark oil tank 134 through line 135. The cooled liquor from liquor-cooling tank 88 is recirculated through line 83 and pump 136 to cooling tower 82. Cooled liquor from liquor-cooling tank 117 is recirculated through line 113 and pump 137 to spray chamber 112 which is equipped with emergency draw-off line 138 which leads to the sewer. In separating means 78 the contaminated liquor from scrubbing tower 67 is separated into oil, water and a coke-water slurry. Skimmed oil is sent to dark oil tank 134 through line 139. The coke-water slurry can be returned to coke-heating kiln 31 through line 140 and pump 141 or withdrawn for use as fuel outside of the sludge conversion unit through line 142. Water is recycled to scrubbing tower 67 through spray 72 by means of line 71 and pump 143 or vented from the system to the sewer through line 144.

Dark oil from dark oil tank 134 may be supplied as fuel to burner 32 by means of lines 145 and 146 through pump 147 to line 34 or to burner 104 through lines 148 and 149 by means of pump 150 and line 108 or may be used elsewhere as fuel.

In carrying out our process with the above or similar apparatus sludge acid from the treatment of hydrocarbon oils, particularly sludge acid from the treatment of oils in the manufacture of lubricating and white oils, enters through line 10 into sludge-receiving tank 11. Since this sludge acid may have a tendency to separate into an oil phase and an acid-carbonaceous material phase, if allowed to stand, it is desirable to keep the contents of the sludge-receiving tank 11 agitated. This may be accomplished by circulating the sludge through lines 13 and 14 by means of pump 15 so that a continual mixing occurs. The contents of sludge-receiving tank 11 are heated by means of steam coils 12, or any other suitable means, in order to decrease the viscosity of the sludge and permit it to be circulated more easily. Open steam within tank 11 should not be used for heating purposes, however, since this will tend to hydrolyze the sludge, separating out the acid and permitting a hard, coke-like layer to form in the receiving tank 11 which is extremely difficult to remove.

The well-mixed sludge which has passed through line 13 to line 14 is sent through valve 16 and line 17 to the sludge decomposer 20 by means of charging pump 18 and line 19.

Sludge from the treating of other hydrocarbon materials of a different nature such as, for example, the treatment of light oils, which is to a large extent immiscible or only slightly miscible with the type of sludge supplied through line 19, or which because of its more dilute nature may tend to hydrolyze the sludge in sludge-receiving tank 11, may be stored in sludge tank 21. This latter sludge acid may be made homogeneous and kept thoroughly mixed by recirculating means similar to that employed with sludge-receiving tank 11 and illustrated by pump 22 and line 23.

The sludge acid from sludge tank 21 may be added to the sludge acid from sludge-receiving tank 11 by injecting it into line 17 just ahead of charging pump 18. In so doing valves 24, 25 and 27 should be so adjusted that a major portion of the sludge flows through line 28 to line 17 and at the same time circulation of the sludge through tank 21 maintained. On the other hand, the sludge acid from sludge tank 21 may be sent directly to sludge decomposer 20 by means of line 26. In this case valves 24, 25 and 27 are likewise adjusted to permit circulation of sludge in tank 21 and to regulate the flow of sludge to the decomposer 20.

Coke from any suitable source is led from feed hopper 29 to coke-heating kiln 31. When the process is first started up coke may be supplied from any outside source and is preferentially petroleum coke. When the process is in continuous operation, however, the coke from the decomposition of the sludge may be and preferentially is recycled to the feed hopper. The coke is aided in its passage from feed hopper 29 by vibrating feeders 30 which assist in the even and regular rate of distribution of the coke to coke-heating kiln 31.

Coke-heating kiln 31 is of the rotating type making approximately four revolutions per minute. The coke is heated by means of burner 32. This burner may use either gas, or oil and steam, as fuel and, as shown, is so designed that these fuels may be used interchangeably, gas being fed through line 33 while oil and steam enter through lines 34 and 35 respectively. The coke is heated to the proper temperature which should be from about 900° F. to about 1200° F. Flue gases plus any volatile material obtained from the heating of the coke pass under bridge wall 49 and are vented to the atmosphere through vent 47. A water spray 50 helps to cool the exiting gases somewhat, as well as remove entrained particles and dust from the coke. Water spray 48 aids in further cooling the exiting gases, thereby minimizing danger of fire from excess heating of overhead enclosures, etc.

In sludge decomposer 20, which is also of the rotating type, the hot coke from coke heating kiln 31 decomposes the sludge acid. The decomposition products generally consist of sulfur dioxide, volatile hydrocarbons, water vapor, carbon dioxide, air and coke. The coke falls to the bottom of stationary header 52 and the remainder of the decomposition products pass overhead through line 66. Feeder 54 forces the coke through passage 53 to bucket elevator 55. As it exits, the coke has a temperature range of approximately 350°–500° F. In order to cool the coke, water can be supplied through spray 56 and further quenching by means of steam can be accomplished by injecting steam through line 57. The coke is carried upward by bucket elevator 55 to coke conveyor 60 where it is returned to feed hopper 29.

Feed hopper 29 is so designed that coke in excess of that usable in the process is sent by means of conveyor 61 to coke disposal bin 62. Spray 63 may be used for spraying water on the coke on conveyor 61 for further cooling and dust laying. The coke from coke disposal bin 62 may be removed from the system by means of coke car 64 or a similar means. Water from spray 65 is used for laying dust from the coke in car 64.

Because it is not practical to assure air-tight fittings at the points where the coke enters and leaves sludge decomposer 20 and because the presence of large amounts of dust in the air is extremely hazardous, a dust removal system is supplied. A flanged duct leads from the feeder to bucket elevator 55 to line 39 and a similar flanged duct from feeder 37 leads to line 38 which joins line 39 and passes to dust-removal system 40. In addition, dust from the coke as it is deposited on coke conveyor 60 from bucket elevator 55 is collected in conveyor dust hood 58 from which it passes through line 59 to line 39 and dust-removal system 40. Water from water spray 41 in dust-removal system 40 tends to remove a large portion of the collected dust. This dust-water mixture may be removed from dust-removal system 40 by line 44 from the base of dust-removal system 40 or by line 45 which leads from an overflow system in dust-removal system 40 through line 46 to the sewer or other suitable disposing means. A fan 42 tends to place sufficient suction on the dust-removal system 40 and connecting lines 38, 39 and 59 to remove the greater part of the dust. The comparatively dust-free air is vented to the atmosphere through vent 43.

The sulfur dioxide, volatile hydrocarbons, water vapor, carbon dioxide, air plus some dust and light particles carried along by entrainment pass overhead from header 52 through line 66 to scrubbing tower 67 in which the dust and the heavier of the volatile hydrocarbons are removed. These less volatile components impinge upon a liquor layer in scrubbing tower 67 which is supplied from line 71 and spray 72 with circulating liquor which will be described in greater detail later. The liquor level in scrubbing tower 67 may be controlled by continuous overflow means 73 and line 75 or intermittent overflow means 74 and line 76. An emergency spray 68 is provided for further cooling.

The heavier hydrocarbons, coke particles, dust, etc. having been removed, the overhead gases pass through conduit 79 to cooling tower 82, filled with checkerwork. These gases are at approximately 180° F.

A hand control damper 80 acts to maintain the proper vacuum on scrubbing tower 67, decomposer 20 and the intervening connections. Jug valve 81, in line 79, is used to shut off one of the units in cases where two or more units utilize one cooling tower. The volatile material is further cooled in cooling tower 82 by liquor from line 83 and spray 84, as well as water from emergency line 85 and emergency spray 86 if necessary. This procedure will further remove condensable hydrocarbons. The water level in cooling tower 82 is maintained at any desired height so that the gases from line 79 impinge upon it and the excess is led through line 87 and liquor cooling tank 88 where it is cooled to approximately 90° F. and returned through line 83 by means of pump 136 to spray 84. Naturally as a certain amount of sulfur dioxide is absorbed in the water in cooling tower 82, by recirculating it through liquor cooling tank 88 and thereby avoiding discarding it to the sewer, the minimum amount of sulfur dioxide will be lost.

It is extremely important that a liquor saturated with sulfur dioxide be used. For example, the stream of volatile material from decomposer 20 contains approximately 50% sulfur dioxide. Water at 180° F. and at one atmosphere pressure, under these conditions will contain approximately 0.2% sulfur dioxide. At 104° F., however, the water will contain approximately 3.2% sulfur dioxide. It can be seen, therefore, that the discharge of cooling water from scrubber 67 at the higher temperature will not entail any great loss of sulfur dioxide to the sewer, but the use of continuous fresh water for cooling in cooling tower 82, with subsequent discharge of the saturated water at approximately 100° F. would entail a loss of a substantial amount of valuable sulfur dioxide. By recirculating the sulfur dioxide saturated water through cooling tower 82, further absorption of sulfur dioxide is avoided, and that present is not discharged from the system.

The wash water removed from scrubbing tower 67 for discharge from the system should be at a temperature of at least about 150° F., and preferably above 170° F.

This is also true to a lesser extent in spray chamber 112 and spray tower 119. The sulfur dioxide stream from furnace 100 contains approximately 15% sulfur dioxide. The exiting liquor from chamber 112 is at approximately 140° F. and will contain about 0.4% sulfur dioxide. The exiting liquor from tower 119 is at approximately 115° F. and will contain approximately 0.7% sulfur dioxide dissolved therein.

In order to prevent the fouling of cooling tower 82 by entrained tar etc., which may not be removed in scrubbing tower 67, a cleaning means (not shown) may be inserted in line 79. This may take any one of a number of forms, for instance, it may be of the bag type or it may be a thermal or an electric dust precipitator, or even of the cyclone cleaner variety. Any effective means for removal of dust and entrained material may be employed which will serve to prevent the fouling of cooling tower 82.

The gases pass overhead from cooling tower 82 through line 92 to oil separator 93. Oil separator 93 is also filled with a checker work of acid-proof brick and a further separation of the condensed hydrocarbons from the sulfur dioxide may be accomplished. Additional cooling is provided by water from spray 94 from line 95 and line 83. An emergency water spray 96, having a thermostatically controlled valve, in line 98, prevents excessive exit gas temperatures. Generally there is only a slight difference in temperature between the exit gases from cooling tower 82 and the exit gases from oil separator 93. The overhead vapors from oil separator 93 will now consist chiefly of sulfur dioxide, water vapor, air and a few last traces of hydrocarbons. These gases pass by line 98 to furnace 100, assisted by blower 99, which serves to draw the decomposition products from decomposer 20, spray tower 67, through cooling tower 82 and oil separator 93 and the connecting lines. Water seal 102 may be used in order to prevent hot gases from blowing back during the period when sulfur dioxide from furnace 100 is being brought up to temperature prior to actual operation. Water is removed from the seal during operations.

In furnace 100 the last traces of hydrocarbons and non-condensables are burned out, heat being supplied from burner 104 which may use gas through line 105 or oil and steam through lines 106 and 107 respectively as fuel. Blower 109 supplies air for combustion. In place of gas or oil sulfur may be burned to provide additional sulfur dioxide as well as heat for combustion. Vent 111 is provided for venting gases during the period when the furnace is being heated prior to operation. When coming on stream the gas is vented to the air through valved vent stack 101 until the composition of the gas stream on the upstream side is outside the explosive range. The gases exit from furnace 100 through line 110 at about 1600° F. These pass to a two-stage cooling system consisting of a spray chamber 112 and a spray tower 119. Cooling water is supplied through line 113 and spray 114 while a proper level of liquor is maintained by overflow means 116 to which is connected line 115. The hot gases impinge upon the liquor surface and are sprayed and will exit through line 118 at about 150° F. Further cooling in spray tower 119 by water through line 123 reduces the temperature of the exit gases to approximately 100° F. The sulfur dioxide, free of hydrocarbons and extraneous material exits from spray tower 119 through line 120 where it passes to any conventional system for converting the sulfur dioxide to sulfuric acid or to a compressing and cooling system for the formation of liquid sulfur dioxide.

Since in a process of this nature a considerable amount of by-products are formed which are not directly usable in the manufacture of sulfuric acid, it becomes advisable to provide means for their recovery and disposal. The bottom product from spray tower 67 will consist of condensed oils and hydrocarbons, water saturated with sulfur dioxide, and a certain amount of coke and dust. This passes through line 77 to a separator means 78. Here the bottom product is separated into a light oil or skimmed oil which will flow overhead through line 139 to dark oil tank 134. A bottom product consisting of a slurry of coke and dust and water can be forced through line 140 by pump 141 to coke-heating kiln 31, or can be sent elsewhere for use as fuel through line 142. The addition of this slurry of water and coke to the coke-heating kiln 31 may be advantageous, however, because by cooling the incoming coke, a certain amount of soot prevention is obtained as well as better combustion conditions. The water which is saturated with sulfur dioxide is returned by line 71 and pump 143 to the spray in scrubbing tower 67 where it serves to cool further the incoming gases from sludge decomposer 20 and line 66.

The heavy hydrocarbons separated in cooling tower 82 are further separated into water and oil in liquor-cooling tank 88, the water being returned through line 83 and pump 136 to act further as a cooling medium in cooling tower 82, while the oil is led by line 131 to settling tank 130 where it is further allowed to separate and the oil taken overhead through line 135 to dark oil tank 134 while the water, small in amount, may be sent to the sewer either by line 132 or, when it is desired to flush the tank, through line 133. The bottom liquor from spray tower 119 passes by line 122 to liquor cooling tank 121 and is recirculated through line 123 and pump 124 to spray tower 119 to act further as a cooling medium. Cooling water to liquor cooling tanks 88, 117 and 121 is supplied by lines 127, 127a, 127b and 127c, and may be discharged to the sewer through lines 128a, 128b and 128c. Excess overflow from cooling tank 121 may be sent to liquor cooling tank 117 where it mingles with the liquor from spray chamber 112 and is returned to spray chamber 112 for use as a cooling medium. Excess liquor from line 123 may be diverted to line 83 and cooling tower 82 by means of valved line 126.

The heavy hydrocarbons known as dark oil may be used as a part of the fuel in burner 32 or in sulfur dioxide furnace burner 104 or may be sent to storage. If the oil is to be used in burner 32 it passes from dark oil tank 134 by means of lines 145 and 34 through pump 147. Mixing with steam from line 35 occurs just prior to its injection as fuel in burner 32.

If the oil is to be supplied to burner 104 then it will pass through line 145 and pump 150 to lines 148 and 149 where it is mingled with steam from line 107 with or without oil from line 106 and injected into the burner through line 108.

Although separating means 78 may be any effective means for separation of the oil-water-coke mixture, we find it highly preferably to use a Dorr classifier. On the other hand, however, it is quite possible to use a settling box, or preferably a bed of fine material, through which the mixture is allowed to filter. We have found that a bed of fine coke from this process is particularly effective for the removal of coke and tarry material from this by-product mixture.

Excess wash liquor is discharged from the system through line 144. Since the exit wash liquor from scrubbing tower 67 is at a temperature above about 150° F. and preferably above about 170° F., the amount of sulfur dioxide lost will not exceed about 0.4% of the amount available from the sludge decomposer 20. Actually, it will be much less than this since only a small part of the wash liquor is discarded. Moreover, excess wash liquor from cooling tower 82 and oil separator 93 finds its way to scrubbing tower 67 via lines 87, 97 and 129, and 71 and excess wash liquor from spray chamber 112 and spray tower 119 finds its way to cooling tower 82 via lines 123, 126 and 83 and thence to scrubbing tower 67 with the other wash liquor from cooling tower 82, all of which is discharged at above about 150° F. and then separated in separating means 78, with discharge, if necessary, through line 144, thereby eliminating any loss of sulfur dioxide in the cooler wash liquors from towers 82, 93, 112 and 119.

Although we have described our invention as having only one coke-heating kiln, one sludge decomposer, etc., it should be understood that it is not only possible but usually desirable to include two or more units so that there may be continuous and uninterrupted operation. In the process of the type described, therefore, there would be two or more vibrating feeders 30 to coke-heating kiln 31, with their accompanying blowers, fuel lines, plunger feeders, dust collectors, etc., two or more sludge decomposers with feed supply lines, exit lines, bucket elevators, etc., as well as two or more original scrubbing towers. We have found that in a dual system after the preliminary scrubbing towers, a single cooling tower and oil separator, as well as a single sulfur dioxide furnace, is sufficient to handle properly the volatile products from the sludge decomposer.

We claim:

In a sludge coking process including decomposing acid sludge with hot coke from a heating kiln fired by an oil burner, and washing the effluent vapors from said sludge decomposition with water to condense oil vapors and precipitate coke particles, thus forming a wash liquor comprising water, oil, and coke particles, the improvement comprising separating said wash liquor into three fractions comprising respectively the bulk of said oil, the bulk of said coke particles, and the bulk of said water, directing said oil fraction to said oil burner, directing said coke fraction to said coke heating kiln, recycling a major portion of said separated water fraction to said first washing step and eliminating a minor portion of said water fraction at a temperature above 150° F. to minimize sulfur dioxide solubility therein, again washing the vapors passing said first washing step with water at a temperature lower than that of said first washing step to recover additional oil, separating said recovered oil from said second wash water, recycling a major portion of said separated second wash water to said second washing step and directing a minor portion of said separated second wash water to said first washing step.

CARROLL D. FENTRESS.
CLAUDE P. McNEIL.
EDWIN G. WILEY.